United States Patent
Oda et al.

(10) Patent No.: US 10,917,472 B2
(45) Date of Patent: Feb. 9, 2021

(54) DATA DELIVERY SYSTEM, INDICATION DEVICE, DATA DELIVERY DEVICE, SENSOR MANAGEMENT DEVICE, DATA DELIVERY METHOD, AND PROGRAM

(71) Applicant: OMRON Corporation, Kyoto (JP)

(72) Inventors: Toshihiko Oda, Kusatsu (JP); Tetsuji Yamato, Yokohama (JP); Shuichi Misumi, Kyoto (JP); Sangryul Lee, Kusatsu (JP); Ryota Yamada, Tokyo (JP); Takeshi Naito, Ibaraki (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/346,887

(22) PCT Filed: Oct. 25, 2017

(86) PCT No.: PCT/JP2017/038527
§ 371 (c)(1),
(2) Date: May 2, 2019

(87) PCT Pub. No.: WO2018/110099
PCT Pub. Date: Jun. 21, 2018

(65) Prior Publication Data
US 2020/0059519 A1  Feb. 20, 2020

(30) Foreign Application Priority Data
Dec. 15, 2016 (JP) ................................. 2016-242931

(51) Int. Cl.
*H04L 29/08* (2006.01)
(52) U.S. Cl.
CPC .................................. *H04L 67/12* (2013.01)

(58) Field of Classification Search
CPC ..... H04L 67/12; H04L 47/10; H04L 67/2809; H04W 4/70; H04W 4/38
See application file for complete search history.

(56) References Cited

U.S. PATENT DOCUMENTS

| | | | | |
|---|---|---|---|---|
| 9,585,019 B2* | 2/2017 | Kawamura | ............ | G06Q 50/18 |
| 9,898,539 B2* | 2/2018 | Kawamura | ............ | G08G 1/04 |
| 10,121,381 B2* | 11/2018 | Hisano | ................ | G08G 1/0112 |
| 10,121,382 B2* | 11/2018 | Hisano | ................ | G08G 1/22 |
| 2014/0214726 A1* | 7/2014 | Minato | .................. | H04W 4/38 |
| | | | | 705/400 |

(Continued)

FOREIGN PATENT DOCUMENTS

| | | |
|---|---|---|
| EP | 2801962 A1 | 11/2014 |
| JP | 2014-045242 A | 3/2014 |

(Continued)

OTHER PUBLICATIONS

Masatoshi Ogura et al., "Automatic generation of User Interface from Meta-data for sensor network", IPSJ SIG Technical Reports, Jan. 15, 2009, pp. 139-144, vol. 2009 No. 3, Relevance is indicated in the (translated) ISR/WO dated Nov. 28, 2017.

(Continued)

*Primary Examiner* — Shean Toukuta
(74) *Attorney, Agent, or Firm* — Metrolex IP Law Group, PLLC

(57) ABSTRACT

One mode of the present invention is configured to acquire sensor-side metadata including a first label corresponding to a label showing a name given in order to identify event data, to acquire app-side metadata including a second label that is an event condition showing a condition of an event and corresponds to the label, to determine, in a case where sensing data satisfies a requirement of an application, whether the first label and the second label are identical, and to transmit, in the case where these labels are identical, a dataflow control command including information specifying a sensor, information specifying the application and the event condition included in the app-side metadata.

15 Claims, 15 Drawing Sheets

(56) References Cited

U.S. PATENT DOCUMENTS

| | | | |
|---|---|---|---|
| 2014/0267765 A1 | 9/2014 | Stuart et al. | |
| 2014/0372561 A1* | 12/2014 | Hisano | G08G 1/0112 709/217 |
| 2015/0142848 A1* | 5/2015 | Kawamura | G08G 1/04 707/770 |
| 2015/0245212 A1* | 8/2015 | Kawamura | H04L 67/2809 455/410 |
| 2016/0210862 A1* | 7/2016 | Hisano | G08G 1/0145 |
| 2018/0157692 A1* | 6/2018 | Hisano | G06F 17/18 |
| 2019/0258553 A1* | 8/2019 | Misumi | G06F 11/3003 |
| 2019/0266165 A1* | 8/2019 | Yamato | G06F 16/00 |
| 2019/0294436 A1* | 9/2019 | Oda | H04Q 9/00 |
| 2019/0317839 A1* | 10/2019 | Misumi | H04M 11/00 |

FOREIGN PATENT DOCUMENTS

| | | |
|---|---|---|
| JP | 2015-226102 A | 12/2015 |
| JP | 2016-524197 A | 8/2016 |

OTHER PUBLICATIONS

Go Tanaka et al., "Development of Heterogeneous Network Devices Integrating System with Web Browser of Mobile Device", Information Processing Society of Japan Transactions 2011, 2 [CD-ROM], Apr. 15, 2012, pp. 10-19, vol. 2, No. 1, Relevance is indicated in the (translated) ISR/WO dated Nov. 28, 2017.

Satoshi Murata et al., "Design and Implementation of Environmental Sensing Module and Middleware for On-body Placement-Aware Human Probe", Information Processing Society of Japan, Symposium, Embedded Systems Symposium 2012 [online], Oct. 10, 2012, pp. 73-78, Relevance is indicated in the (translated) ISR/WO dated Nov. 28, 2017.

English translation of the International Search Report of PCT/JP2017/038527 dated Nov. 28, 2017.

Written Opinion of PCT/JP2017/038527 dated Nov. 28, 2017.

Extended European search report dated Dec. 5, 2019 in a counterpart European patent application.

* cited by examiner

FIG. 2A

| Sensor-side metadata (event data specification portion) |
|---|
| <Event data specification><br>  <Meas attribute> Temp </Meas attribute><br>  <Desc> Measure indoor temperature with -50-70°C </Desc><br>  <Label> Temp </Label><br></Event data specification> |

FIG. 2B

| App-side metadata (event condition portion) |
|---|
| <Event cond><br>  <Det exp> Temp >=35 </Det exp><br></Event cond> |

FIG. 2C

| Sensing data |
|---|
| <Event data><br>  <Label> Temp </Label><br>  <Val> 40 </Val><br></Event data><br><Distribution data><br>  ....<br></Distribution data> |

FIG. 6A

| Sensor-side metadata (event data specification portion) |
|---|
| <Event data specification><br>  <Meas attribute> Temp </Meas attribute><br>  <Desc> Measure indoor temperature with integer of<br>    -50-70°C </Desc><br>  <Label> Temp </Label><br>  <Meas attribute> Moist </Meas attribute><br>  <Desc> Measure indoor moisture with integer of<br>    0-100% </Desc><br>  <Label> Moist </Label><br></Event data specification> |

| LabelList = ["Temp","Moist"] |
|---|

FIG. 6B

| App-side metadata (event condition portion) |
|---|
| <Event cond><br>  <Det exp> Temp >= 35 and Moist <40 </Det exp><br></Event cond> |

| VariableNameList = ["Temp","Moist"] |
|---|

FIG. 9A

Sensor-side metadata
(event data specification portion)

```
<Event data specification>
  <Meas attribute> Temp </Meas attribute>
  <Desc> Measure indoor temperature with integer of
    -50-70°C </Desc>
  <Label> Temp </Label>
  <Meas attribute> Moist </Meas attribute>
  <Desc> Measure indoor moisture with integer of
    0-100% </Desc>
  <Label> Moist </Label>
</Event data specification>
```

FIG. 9B

Event condition determination program

```
Boolean JudgementFunc (ArrayList val_list) {
    int Temp = Val("Temp");        ⎫ 91
    int Moist = Val("Moist");      ⎭
    if (Temp >= 35 and Moist < 40) {
        return true;               ⎫
    } else {                        ⎬ 92
        return false;              ⎪
    }                              ⎭
}
```

FIG. 9C

App-side metadata (event condition portion)

```
<Event cond>
  <Det exp> Temp >= 35 and Moist <40 </Det exp>
</Event cond>
```

FIG. 11A

| Sensing data |
|---|
| <Event data> <br>   <Label> Temp </Label> <br>   <Val> 40 </Val> <br>   <Label> Moist </Label> <br>   <Val> 10 </Val> <br> </Event data> <br> <Distribution data> <br>     .... <br> </Distribution data> |

FIG. 11B

Data array val_list

| "Temp" | 40 |
|---|---|
| "Moist" | 10 |

FIG. 11C

| Event condition determination program |
|---|
| ```
Boolean JudgementFunc (ArrayList val_list) {
    int  Temp = Val( "Temp" );
    int  Moist = Val( "Moist" );
    if ( Temp >= 35 and Moist < 40 ) {
        return true;
    } else {
        return false;
    }
}
``` |

DATA DELIVERY SYSTEM, INDICATION DEVICE, DATA DELIVERY DEVICE, SENSOR MANAGEMENT DEVICE, DATA DELIVERY METHOD, AND PROGRAM

TECHNICAL FIELD

The present invention relates to a sensor network using sensing data that is output by a sensor device.

BACKGROUND ART

A technology called a sensor network is known. A sensor network enables collection, management and seamless usage of sensing data, by installing sensor devices (hereinafter, simply "sensors") having a sensing function and a communication function in various locations such as industrial facilities and networking these sensors.

Generally, sensors are installed in order to collect data required by the owner of the sensor. Sensing data can also be meaningful to others, not only to the owner of the sensor. Efforts are thus being made to draw up a framework for providing sensing data to others. This framework offers the advantage for data providers of being able to obtain compensation by providing data, and for users who receive provision of data of being able to obtain required data cheaply since investment in installing a sensor is not required.

With the above framework, sensing data is distributed from a sensor management apparatus that manages the sensor to apparatuses on the data user side via a data distribution apparatus. Event distribution is used as a method of providing users with desired data. Event distribution is a method that involves distributing data when a specific event occurs such as a certain value of sensing data exceeding a threshold value.

A conceivable example of event distribution is the case of distributing blood glucose data of a subject when the blood pressure of the subject exceeds a threshold value. In order to perform event distribution, the sensor management apparatus needs to convert sensing data into a specific data format that enables the data distribution apparatus to detect the event. Furthermore, an operator that manages the data distribution apparatus needs to create code for retrieving data to be used in order to detect the event from sensing data. Also, all data that is distributed to apparatuses on the data user side will be disclosed to the data distribution apparatus.

SUMMARY OF INVENTION

Technical Problem

The present invention has been made in view of the above circumstances, and an object thereof is to provide a data distribution system and a data distribution method that are able to render it unnecessary to carry out actions for creating code for retrieving data to be used in order to detect an event from sensing data, and to an instruction apparatus, a data distribution apparatus and sensor management apparatus that are used in this data distribution system.

Solution to Problem

In order to achieve the above object, the present invention can take various modes shown below.

A first mode of the present invention is a data distribution system including an instruction apparatus, a sensor management apparatus, and a data distribution apparatus connected to the instruction apparatus and the sensor management apparatus. The sensor management apparatus includes a first data reception unit configured to receive distribution data which is sensing data output by a first sensor, a generation unit configured to generate transmission data including the distribution data and event data that is used in order to detect an event, and a first transmission unit configured to transmit the transmission data to the data distribution apparatus. The instruction apparatus includes a sensor-side metadata acquisition unit configured to acquire sensor-side metadata including sensor-side attribute information relating to an attribute of the sensing data and a first label corresponding to a label showing a name given in order to identify the event data, an app-side metadata acquisition unit configured to acquire app-side metadata including app-side attribute information relating to an attribute of sensing data required by an application and an event condition showing a condition of the event and described using a second label corresponding to the label, an attribute information matching unit configured to perform matching of the sensor-side attribute information and the app-side attribute information, in order to determine whether the sensing data satisfies a requirement of the application, a determination unit configured to, in a case where the sensing data satisfies the requirement of the application, determine whether the first label included in the sensor-side metadata and the second label described in the event condition included in the app-side metadata are identical, and an instruction unit configured to, in a case where the first label included in the sensor-side metadata and the second label described in the event condition included in the app-side metadata are identical, transmit a dataflow control command including information specifying the first sensor, information specifying the application and the event condition included in the app-side metadata to the data distribution apparatus. The data distribution apparatus includes a dataflow control command reception unit configured to receive the dataflow control command, an event condition program conversion unit configured to convert the event condition included in the dataflow control command into a computer program to generate an event condition determination program, a second data reception unit configured to receive the transmission data, an event condition determination program execution unit configured to execute the event condition determination program, in order to determine whether the event data included in the received transmission data satisfies the event condition included in the dataflow control command, and a second transmission unit configured to, in a case where the event data included in the received transmission data satisfies the event condition included in the dataflow control command, transmit the distribution data included in the received transmission data.

According to the first mode, sensing data is transmitted to the data distribution apparatus together with event data, and a dataflow control command that includes an event condition is transmitted to the data distribution apparatus. The data distribution apparatus converts the event condition into a computer program to generate an event condition determination program, executes the event condition determination program in order to determine whether the event data satisfies the event condition, and distributes the sensing data in the case where the event data satisfies the event condition. It thereby becomes unnecessary for an operator of the data distribution apparatus to create a computer program (code) for retrieving data to be used in order to detect an event from event data. Because people are not involved in the distribution of sensing data, data security can be improved, such as being able to reduce the risk of information leaks and the like. Also, data communication delays due to the intervention of the operator can be prevented.

In a second mode of the present invention, the first data reception unit receives, as the event data, sensing data output by a second sensor that is different from the first sensor.

According to the second mode, the sensing data can be used as event data.

In a third mode of the present invention, the determination unit extracts all of the first labels from the sensor-side metadata, generates a first label list including the extracted first labels, extracts all of the second labels from the app-side metadata, generates a second label list including the extracted second labels, and, in a case where the second labels in the second label list are all included in the first label list, determines that the first labels included in the sensor-side metadata and the second labels described in the event condition included in the app-side metadata are identical.

According to the third mode, label lists are generated from sensor-side metadata and app-side metadata, and the determination is performed through comparison of the label lists. It thereby becomes possible to easily and reliably perform the determination.

In a fourth mode, the data distribution apparatus further includes an event condition determination program storage unit configured to store the event condition determination program in association with the information specifying the sensor and the information specifying the application included in the dataflow control command.

According to the fourth mode, it becomes possible for the data distribution apparatus to execute an event condition determination program that depends on the event data received from the sensor management apparatus.

In a fifth mode, the data distribution apparatus further includes a data storage unit configured to store the received transmission data.

According to the fifth mode, it becomes possible to store data including sensing data and event data.

Advantageous Effects of Invention

According to the present invention, it becomes unnecessary to carry out actions for creating code for retrieving data to be used in order to detect an event from sensing data.

BRIEF DESCRIPTION OF DRAWINGS

FIG. 2A is a diagram showing part of sensor-side metadata, FIG. 2B is a diagram showing part of app-side metadata, and FIG. 2C is diagram showing part of sensing data.

FIGS. 6A and 6B are diagrams for specifically describing the event condition label checking shown in FIG. 5.

FIGS. 9A, 9B and 9C are diagrams for specifically describing the event condition determination program generation shown in FIG. 8.

FIGS. 11A, 11B, and 11C are diagrams for specifically describing the event condition determination processing shown in FIG. 10.

DESCRIPTION OF EMBODIMENTS

Hereinafter, embodiments of the present invention will be described, with reference to the drawings.

Figure 1:
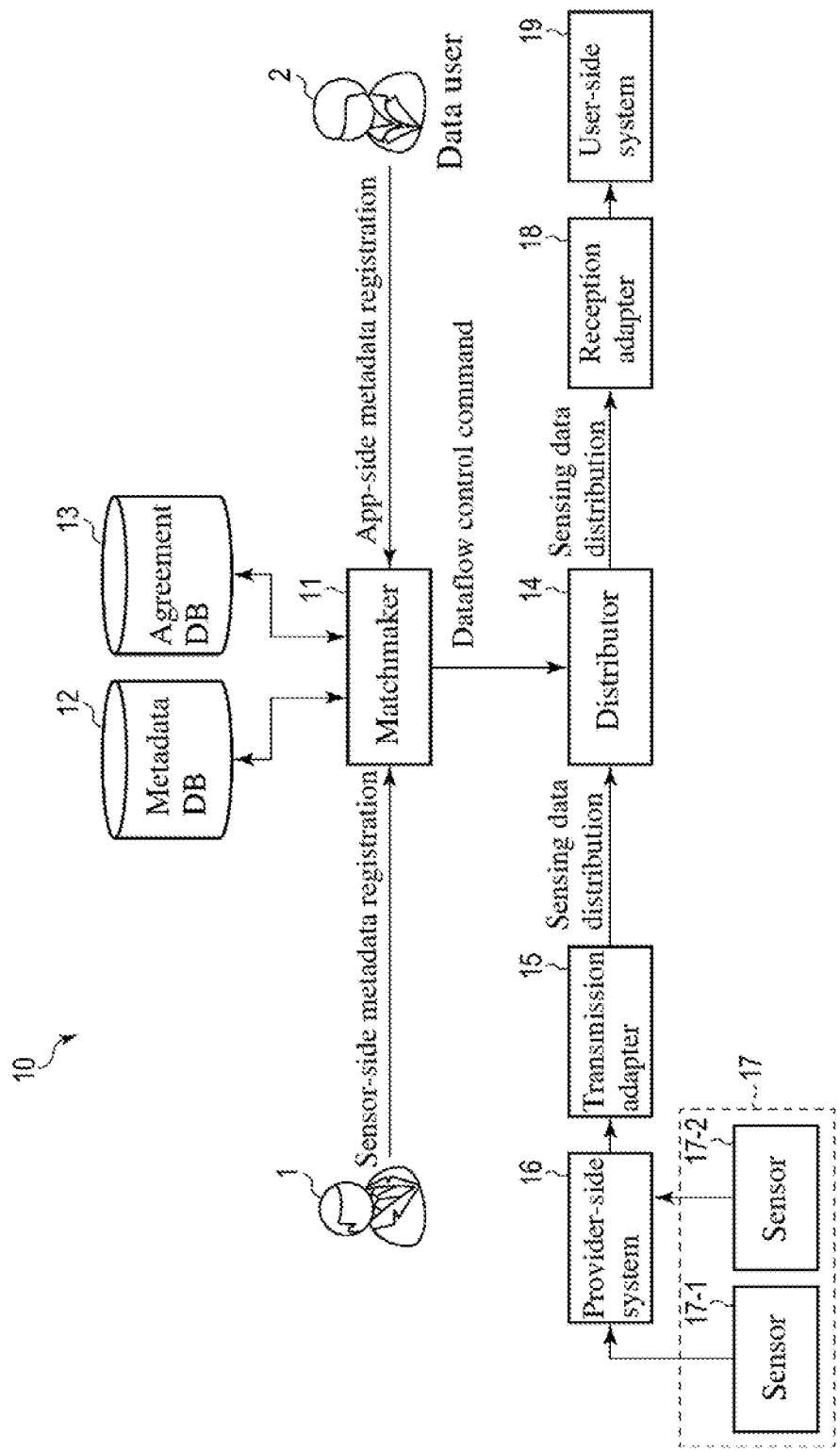
FIG. 1 is a block diagram illustrating a sensor network according to one embodiment of the present invention.

FIG. 1 shows the overall configuration of a sensor network (also called a data distribution system) 10 according to one embodiment of the present invention. As shown in FIG. 1, the sensor network 10 is provided with a matchmaker (also called an instruction apparatus) 11, a metadata DB (database) 12, an agreement DB 13, a distributor (also called a data distribution apparatus) 14, a transmission adapter (also called a sensor management apparatus) 15, a provider-side system 16, a sensor unit 17, a reception adapter 18, and a user-side system 19. The sensor unit 17 is provided with sensors 17-1 and 17-2.

In the present embodiment, in order to simplify description, one each of elements such as the distributor 14, the transmission adapter 15, the provider-side system 16, the reception adapter 18 and the user-side system 19 are shown, but the present invention is not limited thereto, and there may be two or more of each element. For example, a plurality of transmission adapters 15 may be provided, and a plurality of provider-side systems 16 may be respectively connected to the transmission adapters 15.

The provider-side system 16 can be a stationary or portable terminal. For example, in the case where the provider-side system 16 is a portable terminal (e.g., smartphone) and a plurality of transmission adapters 15 are provided, the transmission adapter 15 to which the provider-side system 16 is connected can be changed from one to another, following movement of the provider-side system 16. Also, the user-side system 19 can be a stationary or portable terminal. For example, in the case where the user-side system 19 is a portable terminal and a plurality of reception adapters 18 are provided, the reception adapter 18 to which the user-side system 19 is connected can be changed from one to another, following movement of the user-side system 19.

In the present embodiment, the sensor unit 17 includes two 17-1 and 17-2, but the present invention is not limited thereto, and the sensor unit 17 may include one sensor or three or more sensors. Also, the metadata DB 12 and the agreement DB 13 are provided outside of the matchmaker 11 in FIG. 1, but the present invention is not limited thereto, and the matchmaker 11 may hold at least one of the metadata DB 12 and the agreement DB 13.

The data provider 1 registers sensor-side metadata which is information relating to sensing data that is output by a sensor (e.g., sensor 17-1) in the matchmaker 11. For example, the data provider 1 accesses the matchmaker 11 using a computer terminal which is not illustrated and inputs sensor-side metadata. The matchmaker 11 saves the registered sensor-side metadata to the metadata DB 12.

Sensor-side metadata includes sensor-side attribute information which is information relating to an attribute of the sensing data that is obtained by the sensor and a label showing a name given in order to identify event data. An event indicates that sensing data has entered a specific state such as exceeding or falling short of a certain threshold value. Event data indicates sensing data that is used in order to detect an event, and is contrasted with an event condition described later. The sensor-side attribute information may also include information relating to an attribute of the sensor itself. FIG. 2A shows an example of sensor-side metadata, with only the portion relating to an event data specification being shown here. In this example, the event data relates to temperature and the label "Temp" is set. Sensor-side attribute information includes, for example, attribute information of the sensor, attribute information of a sensing target, attribute information of a sensing target area, attribute information of a sensing operation, and a management attribute of the sensing data.

Referring again to FIG. 1, the data user 2 registers app-side metadata which is information relating to an application that provides a service using sensing data in the matchmaker 11. This application operates on the user-side system 19. For example, the data user 2 accesses the matchmaker 11 using a computer terminal which is not illustrated and inputs app-side metadata. The matchmaker 11 saves the registered app-side metadata to the metadata DB 12.

App-side metadata includes app-side attribute information which is information relating to an attribute of sensing data required by the application, and an event condition showing a condition of the event. The app-side attribute information may also include information relating to an attribute of the application itself. Specifically, an event condition is a Boolean expression describing a condition of the event that the data user wants to detect in event data. The Boolean expression is created using one of the labels disclosed to the data user. FIG. 2B shows an example of app-side metadata, with only the portion relating to the event condition being shown here. In this example, the event condition relates to temperature, and the conditional expression "Temp≥35" is set. Sensor-side attribute information includes, for example, attribute information of the sensor that is required, attribute information of the sensing target that is required, attribute information of a sensing target area that is required, a management attribute of the sensing data that is required, and metadata of the application itself.

Referring again to FIG. 1, the matchmaker 11 performs matching of the sensor-side metadata and the app-side metadata. In the case where matching is established, a transaction agreement between the data provider 1 and the data user 2 is concluded, and transaction agreement information (e.g., combination of metadata ID of the sensor-side metadata and metadata ID of the app-side metadata) is saved to the agreement DB 13. Matching includes specifying a sensor capable of providing sensing data that satisfies a requirement of the application, by performing matching of the sensor-side attribute information and the app-side attribute information, and determining whether the label included in the event data specification portion in the sensor-side metadata that relates to the specified sensor and the label included in the event condition portion in the app-side metadata are identical. In the case where these labels are identical, the matchmaker 11 transmits a dataflow control command that includes information specifying the sensor, information specifying the application and the event condition in the app-side metadata to the distributor 14.

Each of the sensors 17-1 and 17-2 is a device that detects a certain physical quantity or a change therein, and records or outputs the detection result as sensing data. The provider-side system 16 is physically or electrically connected to the sensors 17-1 and 17-2, and collects and manages sensing data. As one example, the sensing data that is output by the sensor 17-1 is used as distribution data, and the sensing data that is output by the sensor 17-2 is used as event data. The format of event data is defined with the combination of a label and a value. Distribution data refers to data that is distributed to a user. The format of distribution data is suitably decided by the data provider 1. Distribution data is converted to text. Distribution data can further be encrypted. For example, the provider-side system 16 is a switchboard installed in a building, the sensor 17-1 is a wattmeter provided in the switchboard, and the sensor 17-2 is a sound pressure meter provided in the switchboard. In another example, the provider-side system 16 is a health monitoring apparatus, the sensor 17-1 is a blood glucose measuring instrument, and the sensor 17-2 is a sphygmomanometer.

Note that the sensing data that is output by the sensor 17-2 may also be used as distribution data. That is, distribution data may also include sensing data that is output by the sensor 17-1 and sensing data that is output by the sensor 17-2. Also, distribution data and event data may be data output by the same sensor. Also, event data is not limited to sensing data that is output by a sensor such as the sensor 17-2, and any other suitable data may be used.

The transmission adapter 15 is for managing the sensors 17-1 and 17-2, and collects sensing data from the sensors 17-1 and 17-2 through the provider-side system 16. The transmission adapter 15 receives distribution data and event data from the provider-side system 16, generates transmission data that includes distribution data and event data, and transmits the generated transmission data to the distributor 14 as sensing data. FIG. 2C shows an example of sensing data that is transmitted to the distributor 14 by the transmission adapter 15. In this example, the event data portion contains "Temp" as the label and 40 as the value. Note that event data is optional, and event data need not be included in the sensing data that is transmitted to the distributor 14.

The distributor 14 receives a dataflow control command from the matchmaker 11, and receives sensing data from the transmission adapter 15. Here, the dataflow control command is assumed to be for instructing that sensing data output by the sensor 17-1 is distributed to the user-side system 19. The distributor 14 determines whether the event data included in the received sensing data satisfies the event condition included in the received dataflow control command. The distributor 14 transmits the distribution data included in the received sensing data to the user-side system 19 as sensing data, in the case where the event data satisfies the event condition, and does not transmit the distribution data, in the case where the event data does not satisfy the event condition. The sensing data addressed to the user-side system 19 may include event data. The reception adapter 18 receives the sensing data from the distributor 14, and transfers the received sensing data to the user-side system 19.

Figure 3:
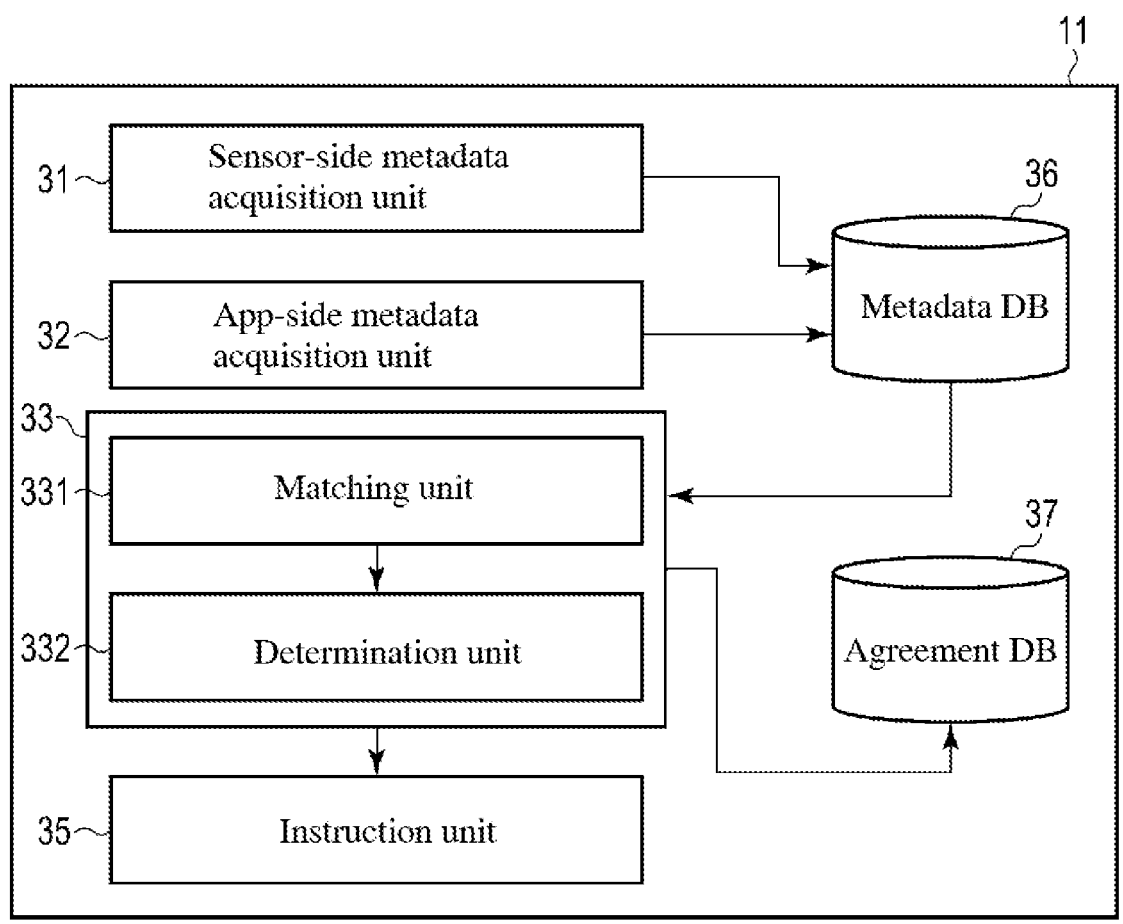
FIG. 3 is a block diagram showing an exemplary configuration of an instruction apparatus shown in FIG. 1.

FIG. 3 shows an exemplary configuration of the matchmaker 11. As shown in FIG. 3, the matchmaker 11 is provided with a sensor-side metadata acquisition unit 31, an app-side metadata acquisition unit 32, a matching unit 33, a determination unit 332, an instruction unit 35, a metadata DB 36, and an agreement DB 37. The metadata DB 36 and the agreement DB 37 correspond to the metadata DB 12 and the agreement DB 13 shown in FIG. 1.

The sensor-side metadata acquisition unit 31 acquires sensor-side metadata, and stores the acquired sensor-side metadata in the metadata DB 36. The app-side metadata acquisition unit 32 acquires app-side metadata, and stores the acquired app-side metadata in the metadata DB 36.

The matching unit 33 performs matching of the sensor-side metadata and the app-side metadata. As an example, the matching unit 33 performs matching triggered by the app-side metadata acquisition unit 32 acquiring app-side metadata. In this case, one or plurality of sensor-side metadata are stored in advance in the metadata DB 36, and the matching unit 33 performs matching of the app-side metadata acquired by the app-side metadata acquisition unit 32 with each of the sensor-side metadata stored in the metadata DB 36.

The matching unit 33 is provided with an attribute information matching unit 331 and the determination unit 332. The attribute information matching unit 331 performs matching of the sensor-side attribute information of the sensor-side metadata and the app-side attribute information of the app-side metadata, in order to determine whether the sensing data satisfies the requirement of the application.

In the case where the attribute information matching unit 331 determines that the sensing data satisfies the requirement of the application, the determination unit 332 determines whether the label in the sensor-side metadata and the label in the app-side metadata are identical. In the case where these labels are identical, the instruction unit 35 generates a dataflow control command that includes information specifying the sensor, information specifying the application and the event condition in the app-side metadata, and transmits the generated dataflow control command to the distributor 14. As a result of the dataflow control command including the event condition described using the label, it becomes possible to automatically create a computer program for detecting the event in the distributor 14.

Figure 4:
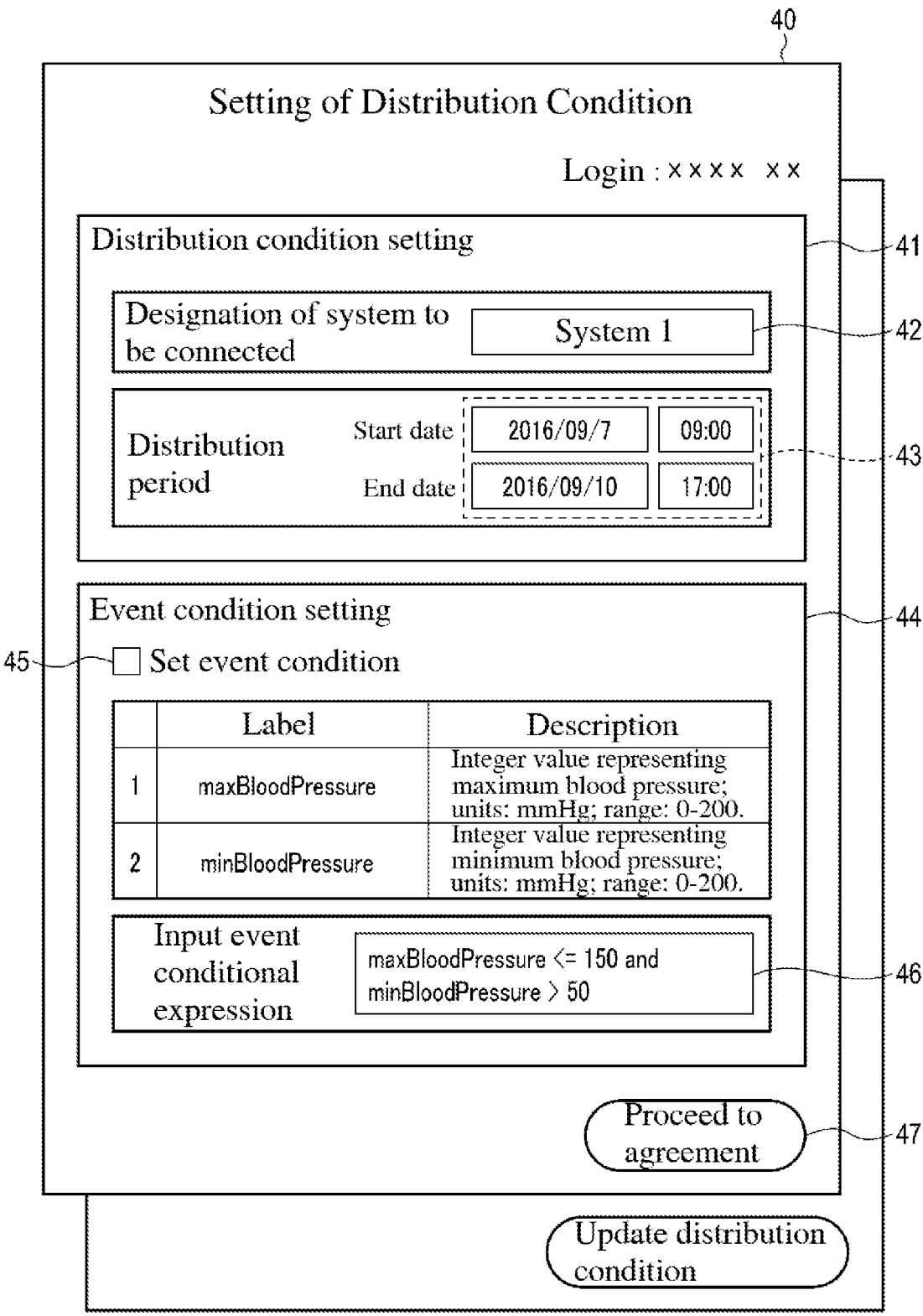
FIG. 4 is a diagram showing an example of an input screen for setting a distribution condition that is presented to a data user.

FIG. 4 shows an example of an input screen for setting the app-side metadata. An input screen 40 shown in FIG. 4 is presented to the data user by the app-side metadata acquisition unit 32. The input screen 40 includes a distribution condition setting area 41 and an event condition setting area 44. The distribution condition setting area 41 includes a text box 42 for designating a user system to be connected to, and a text box 43 for designating a distribution period. The event condition setting area 44 includes a check box 45 for designating whether to set an event condition, and a text box 46 for inputting the event condition. Furthermore, available labels and descriptions thereof are presented in the event condition setting area 44. When a button 47 is clicked after input of the distribution condition is completed, the processing advances to the next step.

Figure 5:
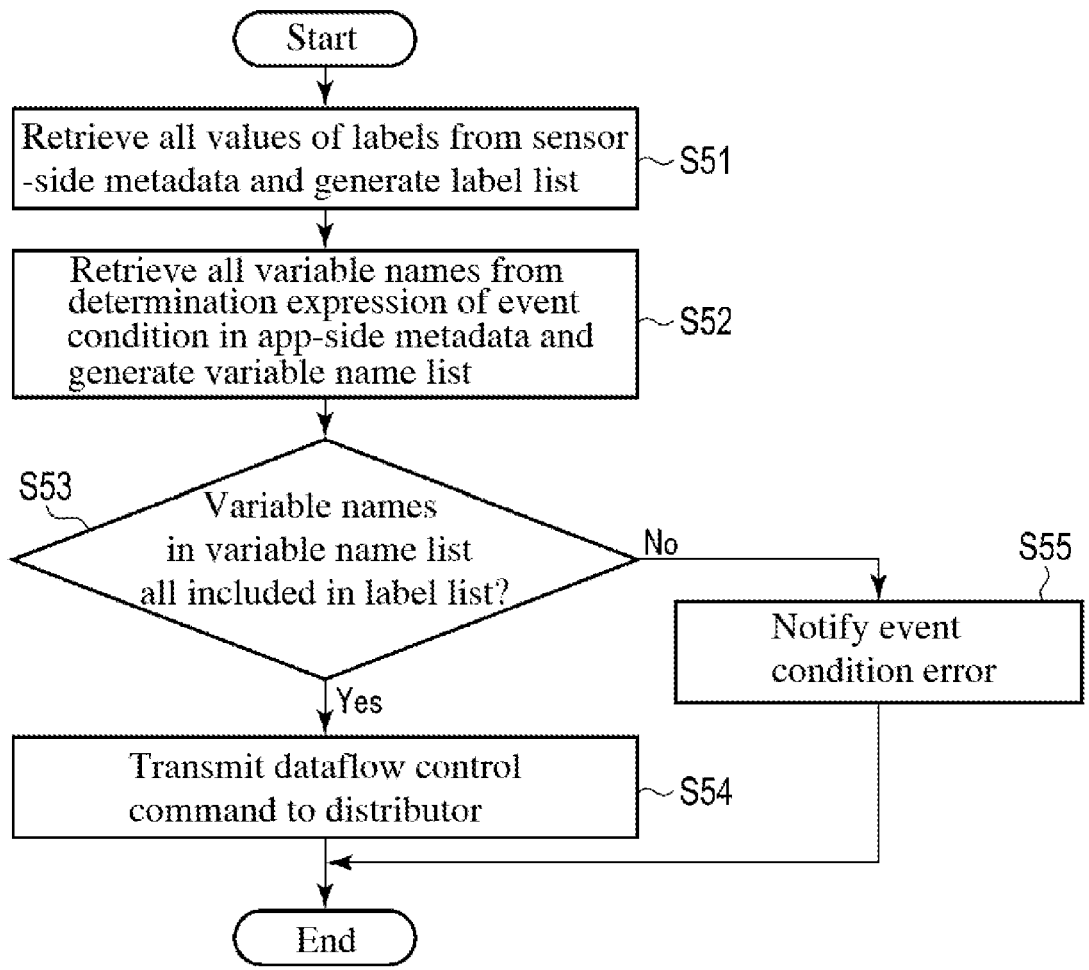
FIG. 5 is a flowchart showing an exemplary procedure of event condition label checking in a matchmaker shown in FIG. 3.

FIG. 5 shows an exemplary procedure of event condition label checking in the matchmaker 11 shown in FIG. 3. The processing shown in FIG. 5 is started after performing matching of the sensor-side attribute information of certain sensor-side metadata and the app-side attribute information of certain app-side metadata, and judging that matching of the sensor-side attribute information and the app-side attribute information is established.

In step S51, the determination unit 332 retrieves all of the values of labels from the event data specification portion of the sensor-side metadata, and generates a label list. In the case where the sensor-side metadata is the data shown in FIG. 6A, a label list containing "Temp" and "Moist" is generated.

In step S52, the determination unit 332 retrieves all of the variable names from a determination expression contained in the event condition portion of the app-side metadata, and generates a variable name list. In the case where the app-side metadata is the data shown in FIG. 6B, a variable name list containing "Temp" and "Moist" is generated.

In step S53, the determination unit 332 determines whether the variable names in the variable name list are all included in the label list. If the variable names in the variable name list are all included in the label list, the processing advances to step S54, and, if this is not the case, the processing advances to step S55. In the example shown in FIG. 6A and FIG. 6B, the variable name list includes "Temp" and "Moist", and these are also both included in the label list. In this case, it is determined that the variable names in the variable name list are all included in the label list (yes).

If the processing advances from step S53 to step S54, the instruction unit 35, in step S54, transmits a dataflow control command to the distributor 14. The dataflow control command includes, for example, information specifying the sensor related to the sensor-side metadata, information specifying the application related to the app-side metadata, and the event condition portion of the app-side metadata.

If the processing advances from step S53 to step S55, an event condition error is notified in step S55. In this case, because the distribution condition desired by the data user is not satisfied, the processing ends without outputting a dataflow control command.

Figure 7:
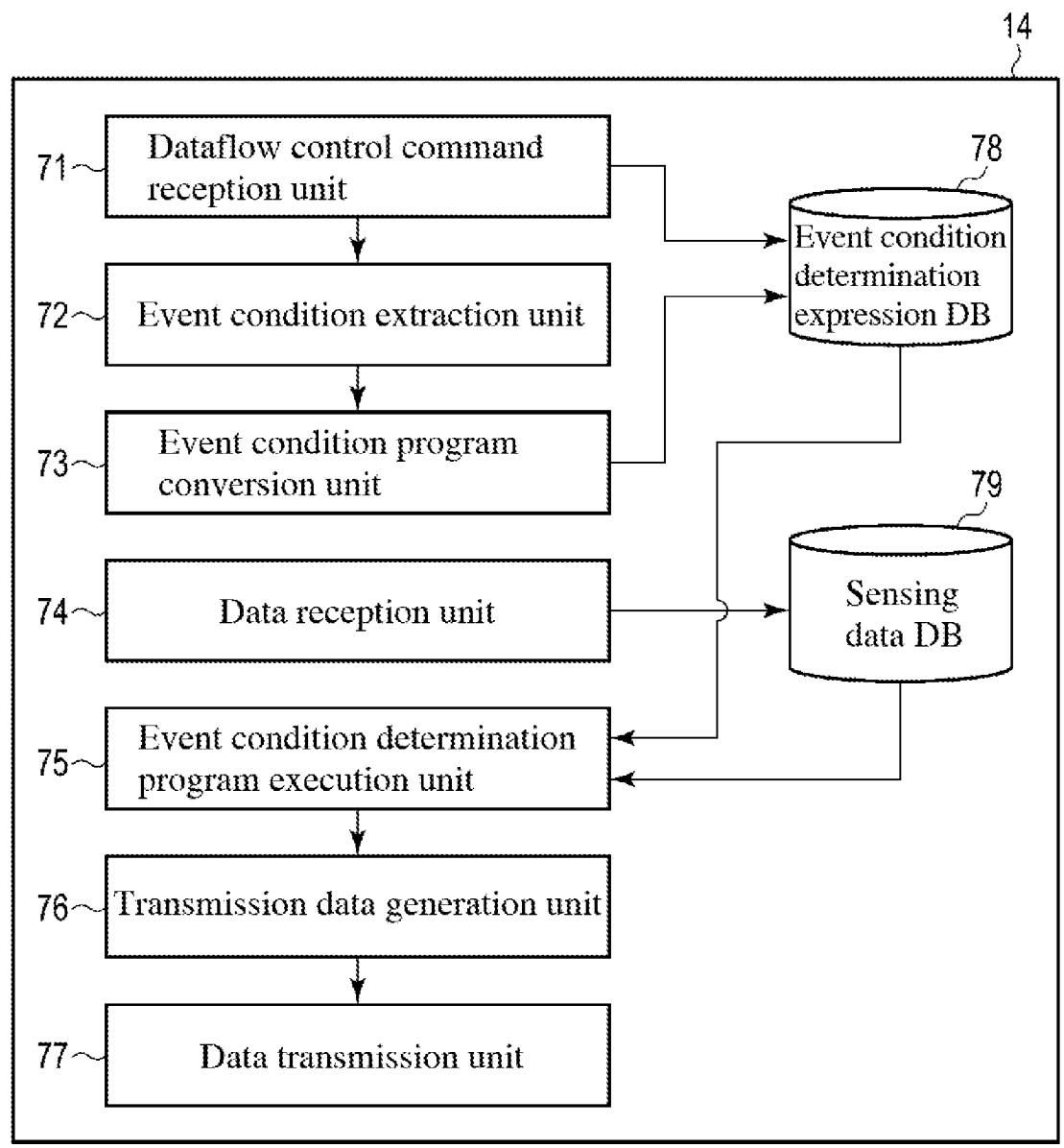
FIG. 7 is a block diagram showing an exemplary configuration of a distributor shown in FIG. 1.

FIG. 7 shows an exemplary configuration of the distributor 14. As shown in FIG. 7, the distributor 14 is provided with a dataflow control command reception unit 71, an event condition extraction unit 72, an event condition program conversion unit 73, a data reception unit 74, an event condition determination program execution unit 75, a transmission data generation unit 76, a data transmission unit 77, an event condition determination expression DB (also called an event condition determination program storage unit) 78, and a sensing data DB (also called a data storage unit) 79.

The dataflow control command reception unit 71 receives the dataflow control command from the distributor 14. The event condition extraction unit 72 extracts the event condition from the received dataflow control command. The event condition program conversion unit 73 converts the extracted event condition into a computer program. The event condition after conversion into a program is called an event condition determination program. The event condition determination program is stored, by a CPU, in the event condition determination expression DB 78 provided in a memory, in association with the information specifying the sensor and the information specifying the application included in the dataflow control command.

The data reception unit 74 receives sensing data from a transmission adapter such as the transmission adapter 15 shown in FIG. 1, and stores the received sensing data in the sensing data DB 79. The event condition determination program execution unit 75 executes the event condition determination program, in order to determine whether the event data included in the received sensing data satisfies the event condition included in the dataflow control command. In the case where the event data satisfies the event condition, the transmission data generation unit 76 retrieves the distribution data included in the received sensing data, and generates transmission data that includes the retrieved distribution data. The data transmission unit 77 transmits the transmission data generated by the transmission data generation unit 76 as sensing data.

Figure 8:
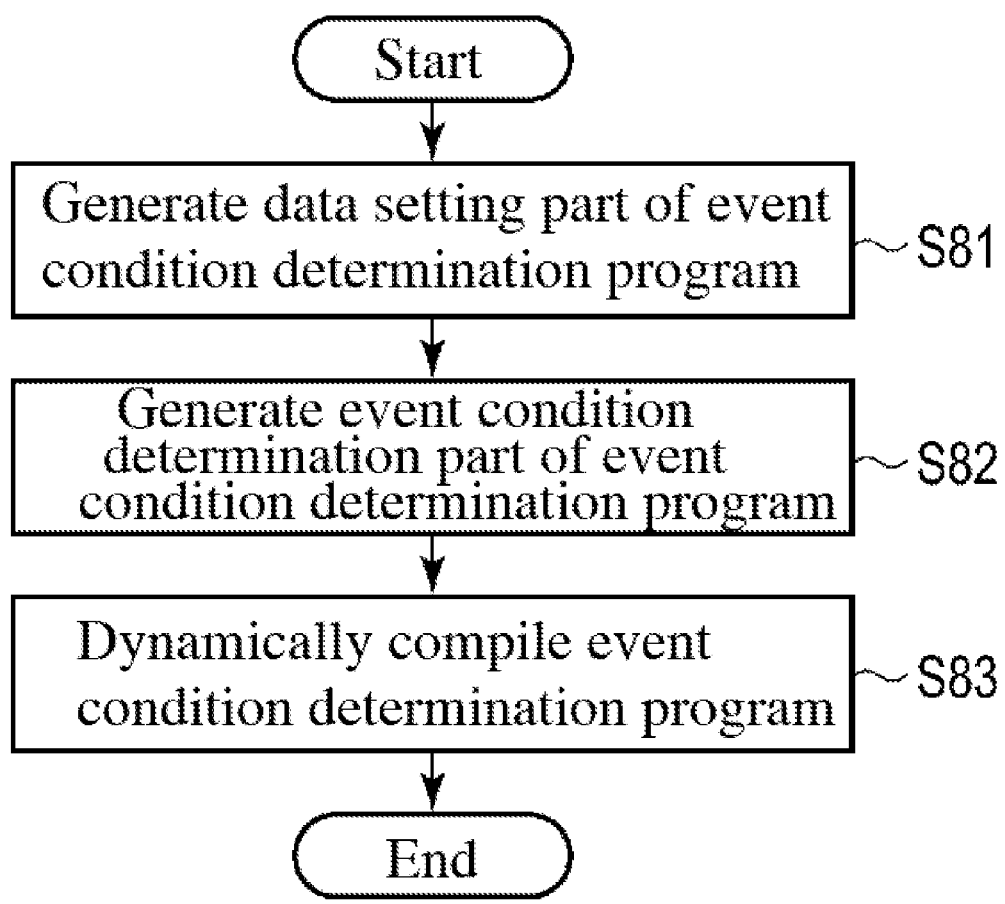
FIG. 8 is a flowchart showing an exemplary procedure of event condition determination program generation in the distributor shown in FIG. 7.

FIG. 8 shows an exemplary procedure of event condition determination program generation in the distributor 14 shown in FIG. 7. In step S81 of FIG. 8, the event condition program conversion unit 73 generates a data setting part of the event condition determination program from the sensor-side metadata. For example, the event condition program conversion unit 73 retrieves all of the values of labels from the event data specification portion of the sensor-side metadata, and creates a portion for a variable assignment expression. In the case where the event data specification portion of the sensor-side metadata is the data shown in FIG. 9A, "Temp" and "Moist" are retrieved, and the data setting part 91 of the event condition determination program shown in FIG. 9B is created using "Temp" and "Moist". The event condition determination program consists of a Judgement-Func function, for example.

In step S82, the event condition program conversion unit 73 generates an event condition determination part of the event condition determination program from the app-side metadata. For example, the event condition program conversion unit 73 retrieves the determination expression from the event condition portion of the app-side metadata, and generates a Boolean expression in an if statement. In the case where the event condition portion of the app-side metadata is the data shown in FIG. 9C, "Temp>=35 and Moist<40" is retrieved and inserted in the event condition determination part 92 of the event condition determination program shown in FIG. 9B.

In step S83, the generated event condition determination program is dynamically compiled. In the case where the code is written in an interpreter language such as Python or Javascript (registered trademark), for example, the code can be directly executed on an interpreter. Thus, in the case where the code is written in an interpreter language, the processing shown in step S83 can be omitted.

Figure 10:
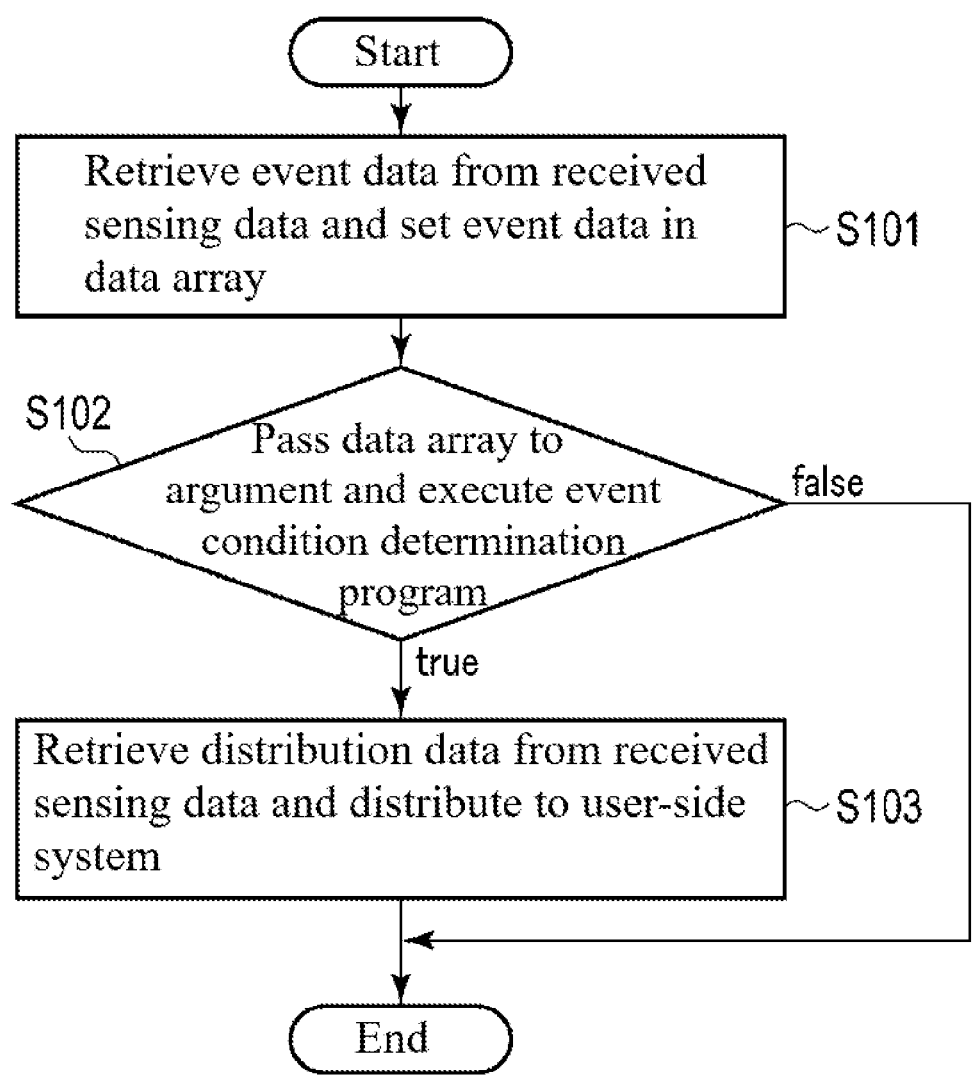
FIG. 10 is a flowchart showing an exemplary procedure of event condition determination in the distributor shown in FIG. 7.

FIG. 10 shows an exemplary procedure of event condition determination in the distributor 14 shown in FIG. 7. In step S101 of FIG. 10, the transmission data generation unit 76 retrieves event data from the sensing data received by the data reception unit 74, and sets the event data in a data array. In the case where the event data portion of the sensing data is the data shown in FIG. 11A, the data array shown in FIG. 11B is generated. In this data array, the value of the label "Temp" is 40 and the value of the label "Moist" is 10.

In step S102, the event condition determination program execution unit 75 passes the data array to an argument and executes the event condition determination program. In the case where true is returned as a result of executing the event condition determination program, that is, in the case where the event data satisfies the event condition, the processing advances to step S103. In the case where false is returned, the processing ends. For example, in the case where the event condition determination program shown in FIG. 11C is executed with the data array shown in FIG. 11B as the argument, both "Temp>=35" and "Moist<40" are satisfied, and thus true is returned as the execution result.

Figure 12:
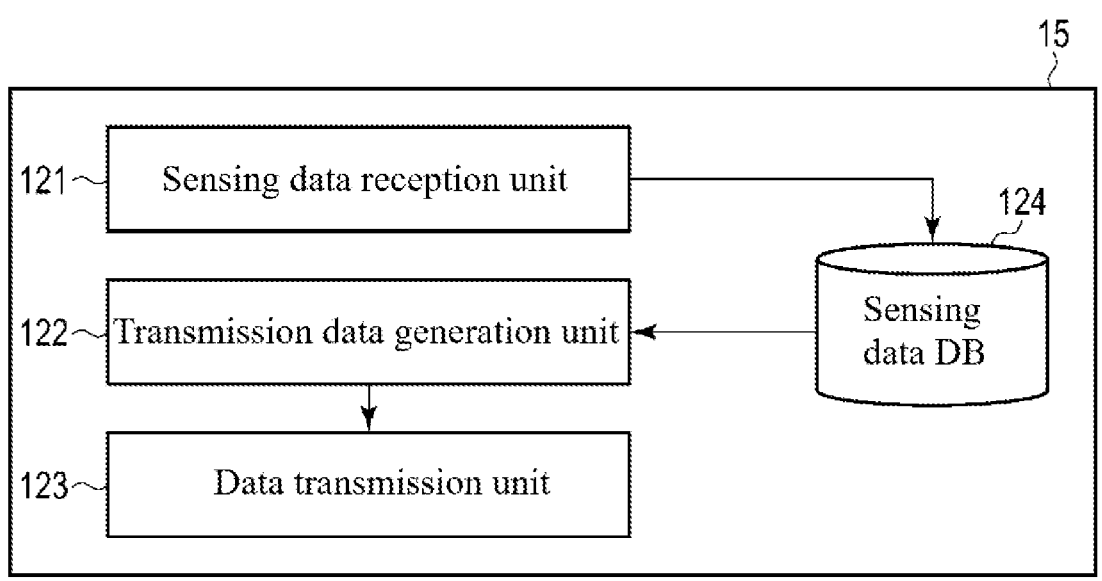
FIG. 12 is a block diagram showing an exemplary configuration of a transmission adapter shown in FIG. 1.

FIG. 12 shows an exemplary configuration of the transmission adapter 15. As shown in FIG. 12, the transmission adapter 15 is provided with a sensing data reception unit 121, a transmission data generation unit 122, a data transmission unit 123, and a sensing data DB 124. The sensing data reception unit 121 receives sensing data from a provider-side system such as the provider-side system 16 shown in FIG. 1, and stores the received sensing data in the sensing data DB 124. The transmission data generation unit 122 generates transmission data including distribution data which is sensing data output by the sensor and received by the sensing data reception unit 121 and event data which is data for detecting the event. For example, the transmission adapter 15 communicates with the distributor 14 in accordance with the HTTP protocol, and distribution data and event data are included in the body part of an HTTP message. The body part may further include identification information (ID) of the sensing data, a reception date/time, and identification information (ID) of the app-side metadata. Also, the transmission data generation unit 76 may encrypt the distribution data, in which case the transmission data includes the encrypted distribution data and event data. In the case where the distribution data is encrypted, the contents of the distribution data will not be revealed in the distributor 14. The data transmission unit 123 transmits the generated transmission data to the distributor 14 as sensing data. As a result of sensing data provided to the distributor 14 being divided into distribution data and event data, event detection in the distributor 14 is facilitated.

Figure 13:
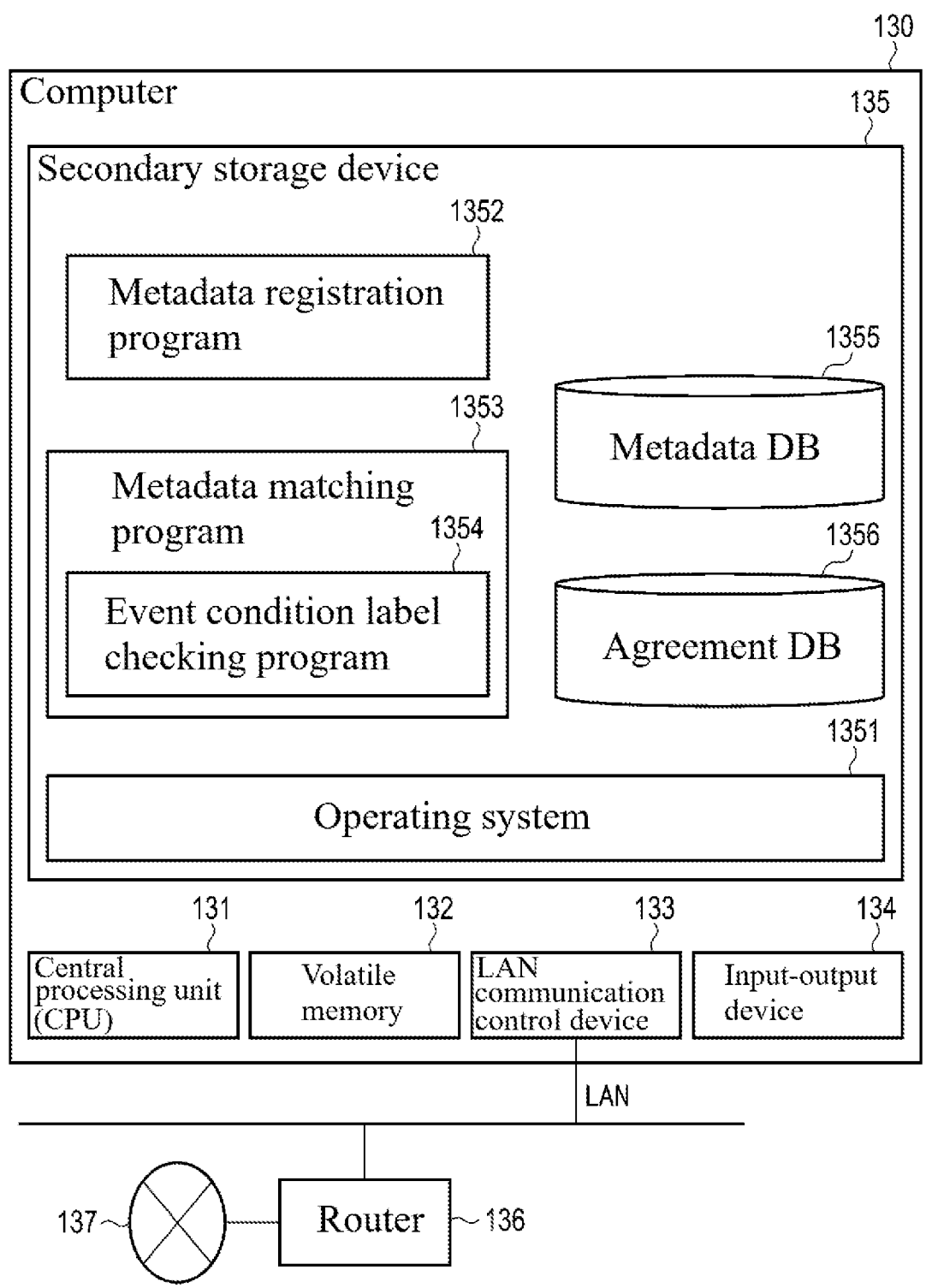
FIG. 13 is a block diagram showing an exemplary hardware configuration of the matchmaker shown in FIG. 1.

FIG. 13 shows an exemplary hardware configuration of the matchmaker. A computer 130 shown in FIG. 13 is provided with a central processing unit (CPU) 131, a volatile memory 132 serving as a main storage device, a LAN communication control device 133, an input-output device 134 and a secondary storage device 135, and these elements are connected to each other via a bus system (not shown) including a data bus or the like.

The secondary storage device 135 is provided with various programs, in order to implement the matchmaker 11 shown in FIG. 1. For example, the secondary storage device 135 is provided with an operating system 1351, a metadata registration program 1352, and a metadata matching program 1353. The metadata registration program 1352, when executed by the CPU 131, is able to cause the CPU 131 to function as the sensor-side metadata acquisition unit 31 and the app-side metadata acquisition unit 32 shown in FIG. 3. The metadata matching program 1353 includes an event condition label checking program 1354, and, when executed by the CPU 131, is able to cause the CPU 131 to function as the matching unit 33 shown in FIG. 3.

Furthermore, the secondary storage device 135 is provided with a metadata DB 1355 and an agreement DB 1356. The metadata DB 1355 and the agreement DB 1356 correspond to the metadata DB 12 and the agreement DB 13 shown in FIG. 1. A hard disk drive (HDD) or a solid-state drive (SSD), for example, can be used as the secondary storage device 135.

The LAN communication control device 133 is a communication interface for communicating with a Local Area Network (LAN). The computer 130 is connected to a network 137 such as the Internet, via the LAN and a router 136. The input-output device 134 includes an interface for inputting or outputting information. For example, the input-output device 134 includes input devices such as a keyboard, a mouse, a microphone and a touch panel and output devices such as a display.

Note that the functions of the matchmaker 11 shown in FIG. 1 are not limited to being realized by a program that is executed by a processor such as the CPU 131. Some or all of the functions of the matchmaker 11 may be realized by a hardware circuit such as an Application-Specific Integrated Circuit (ASIC).

Figure 14:
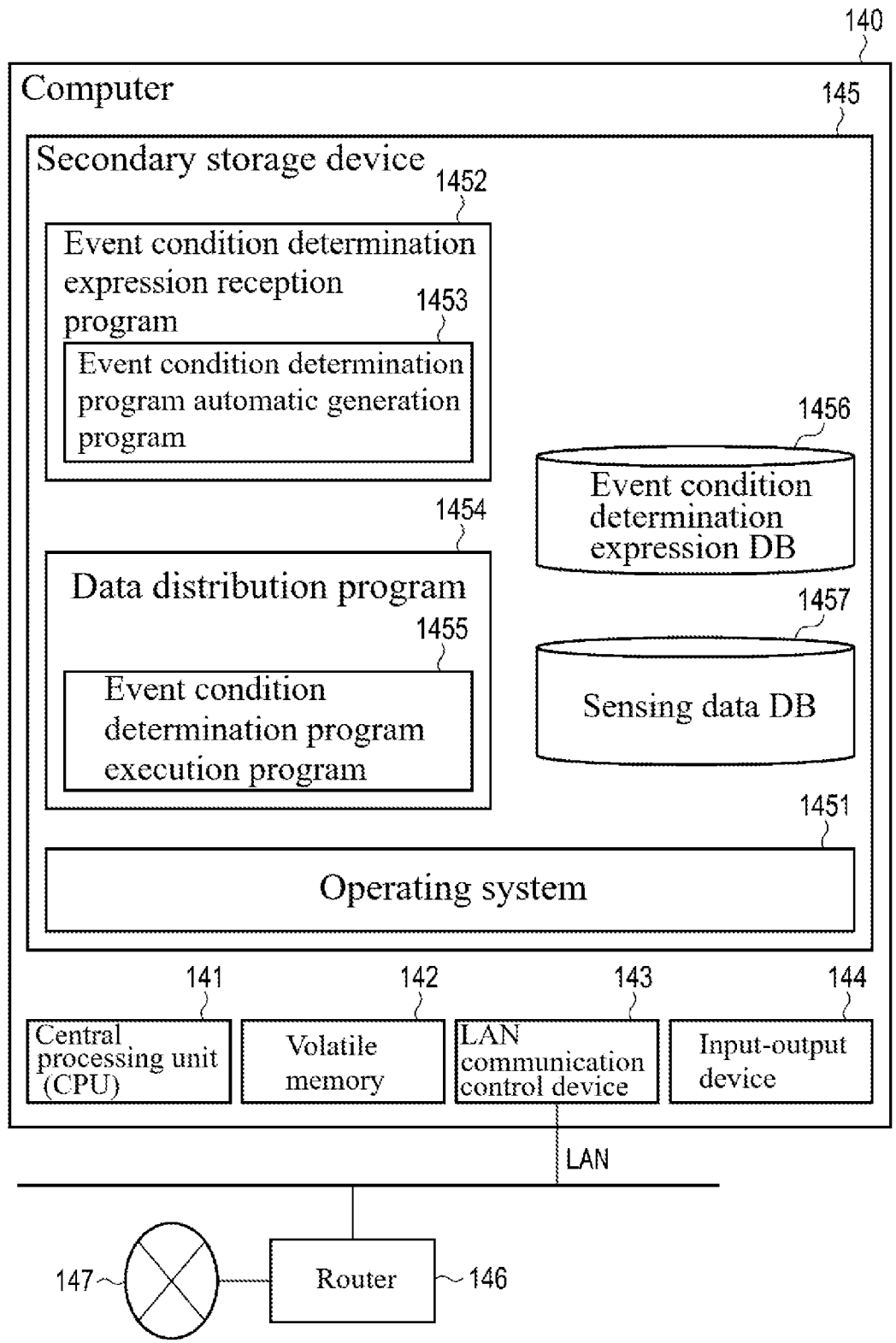
FIG. 14 is a block diagram showing an exemplary hardware configuration of the distributor shown in FIG. 1.

FIG. 14 shows an exemplary hardware configuration of the distributor. A computer 140 shown in FIG. 14 is provided with a CPU 141, a volatile memory 142 serving as a main storage device, a LAN communication control device 143, an input-output device 144 and a secondary storage device 145, and these elements are connected to each other via a bus system (not shown) including a data bus or the like.

The secondary storage device 145 is provided with various programs, in order to implement the distributor 14 shown in FIG. 1. For example, the secondary storage device 145 is provided with an operating system 1451, an event condition determination expression reception program 1452, and a data distribution program 1454. The event condition determination expression reception program 1452 includes an event condition determination program automatic generation program 1453, and, when executed by the CPU 141, is able to cause the CPU 141 to function as the dataflow control command reception unit 71, the event condition extraction unit 72 and the event condition program conversion unit 73 shown in FIG. 7. The data distribution program 1454 includes an event condition determination program execution program 1455, and, when executed by the CPU 141, is able to cause the CPU 141 to function as the data reception unit 74, the event condition determination program execution unit 75, the transmission data generation unit 76, and the data transmission unit 77.

Furthermore, the secondary storage device 145 is provided with an event condition determination expression DB 1456 and a sensing data DB 1457. The event condition determination expression DB 1456 and the sensing data DB 1457 correspond to the event condition determination expression DB 78 and the sensing data DB 79 shown in FIG. 7. An HDD or an SSD, for example, can be used as the secondary storage device 145.

The LAN communication control device 143 is a communication interface for communicating with a LAN. The computer 140 is connected to a network 147 such as the Internet, via the LAN and a router 146. The input-output device 144 includes an interface for inputting or outputting information. For example, the input-output device 144 includes input devices such as a keyboard, a mouse, a microphone and a touch panel and output devices such as a display.

Note that the functions of the distributor 14 shown in FIG. 1 are not limited to being realized by a program that is executed by a processor such as the CPU 141. Some or all of the functions of the distributor 14 may be realized by a hardware circuit such as an ASIC.

Figure 15:
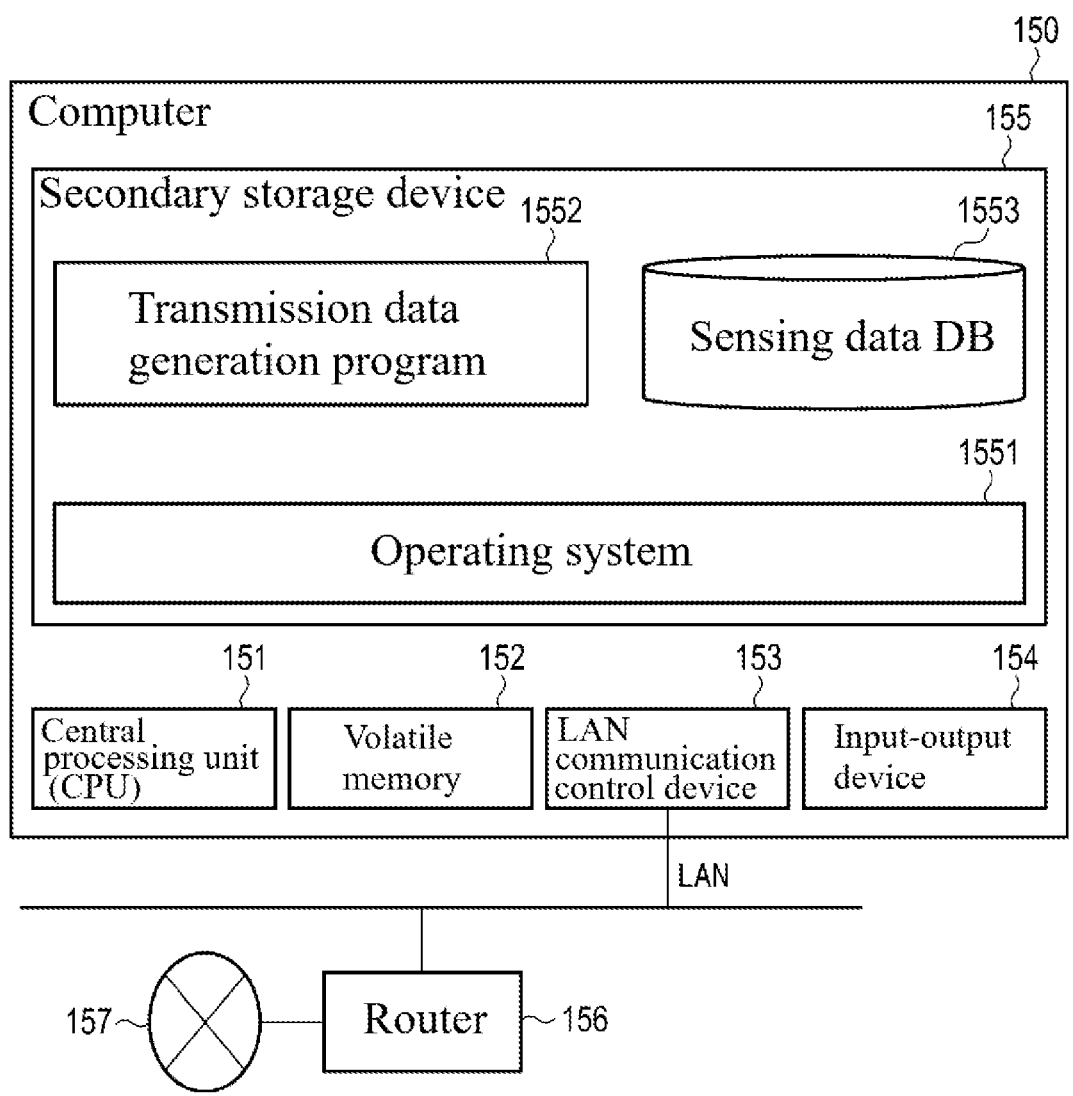
FIG. 15 is a block diagram showing an exemplary hardware configuration of the transmission adapter shown in FIG. 1.

FIG. 15 shows an exemplary hardware configuration of the transmission adapter. A computer 150 shown in FIG. 15 is provided with a CPU 151, a volatile memory 152 serving as a main storage device, a LAN communication control device 153, an input-output device 154 and a secondary storage device 155, and these elements are connected to each other via a bus system (not shown) including a data bus or the like.

The secondary storage device 155 is provided with various programs, in order to implement the transmission adapter 15 shown in FIG. 1. For example, the secondary storage device 155 is provided with an operating system 1551 and a transmission data generation program 1552. The transmission data generation program 1552, when executed by the CPU 151, is able to cause the CPU 151 to function as the transmission data generation unit 122 shown in FIG. 12.

Furthermore, the secondary storage device 155 is provided with a sensing data DB 1553. The sensing data DB 1553 corresponds to the sensing data DB 124 shown in FIG. 12. An HDD or an SSD, for example, can be used as the secondary storage device 155.

The LAN communication control device 153 is a communication interface for communicating with a LAN. The computer 150 is connected to a network 157 such as the Internet, via the LAN and a router 156. The input-output device 154 includes an interface for inputting or outputting information. For example, the input-output device 154 includes input devices such as a keyboard, a mouse, a microphone and a touch panel and output devices such as a display.

Note that the functions of the transmission adapter 15 shown in FIG. 1 are not limited to being realized by a program that is executed by a processor such as the CPU 151. Some or all of the functions of the transmission adapter 15 may be realized by a hardware circuit such as an ASIC.

In the present embodiment, as described above, a distributor receives sensing data (distribution data) output by a sensor and event data written in a typical format from a transmission adapter, converts the received data into code, executes event condition determination processing, and determines whether the sensing data needs to be distributed, based on the processing result. As a result of the event condition being automatically converted to code in the distributor, it becomes unnecessary to carry out actions for creating code of that portion. Furthermore, because the distributor which is a third party does not refer to the distribution data, it is also possible to encrypt the distribution data.

The present invention is not limited to the embodiment as described above, and can be embodied at the implementation stage by modifying constituent elements to an extent that does not depart from the spirit of the invention. Also, various inventions can be formed through appropriate combinations of a plurality of the constituent elements that are disclosed in the above embodiment. For example, some of the constituent elements shown in the above embodiment may be omitted. Furthermore, constituent elements may be combined across different embodiments as appropriate.

Also, the above embodiment can be partially or wholly described as in the following supplementary notes, but the present invention is not limited thereto. A hardware processor described below is realized by a hardware circuit, a program (software) that is executed by a processor, or a combination thereof.

Supplementary Note 1

A data distribution system including an instruction apparatus, a sensor management apparatus, and a data distribution apparatus connected to the instruction apparatus and the sensor management apparatus, the sensor management apparatus including a hardware processor configured to:

receive distribution data which is sensing data output by a first sensor;

generate transmission data including the distribution data and event data that is used in order to detect an event; and transmit the transmission data to the data distribution apparatus, the instruction apparatus including a hardware processor configured to:

acquire sensor-side metadata including sensor-side attribute information relating to an attribute of the sensing data and a first label corresponding to a label showing a name given in order to identify the event data;

acquire app-side metadata including app-side attribute information relating to an attribute of sensing data required by an application and an event condition showing a condition of the event and described using a second label corresponding to the label;

perform matching of the sensor-side attribute information and the app-side attribute information, in order to determine whether the sensing data satisfies a requirement of the application;

determine, in a case where the sensing data satisfies the requirement of the application, whether the first label included in the sensor-side metadata and the second label described in the event condition included in the app-side metadata are identical; and transmit, in a case where the first label included in the sensor-side metadata and the second label described in the event condition included in the app-side metadata are identical, a dataflow control command including information specifying the first sensor, information specifying the application and the event condition included in the app-side metadata to the data distribution apparatus, and the data distribution apparatus including a hardware processor configured to:

receive the dataflow control command;

convert the event condition included in the dataflow control command into a computer program to generate an event condition determination program;

receive the transmission data;

execute the event condition determination program, in order to determine whether the event data included in the received transmission data satisfies the event condition included in the dataflow control command; and transmit, in a case where the event data included in the received transmission data satisfies the event condition included in the dataflow control command, the distribution data included in the received transmission data.

Supplementary Note 2

An instruction apparatus including a hardware processor configured to:

acquire sensor-side metadata including sensor-side attribute information relating to an attribute of sensing data that is output from a sensor and a first label corresponding to a label showing a name given in order to identify event data that is used in order to detect an event;

acquire app-side metadata including app-side attribute information relating to an attribute of sensing data required by an application and an event condition showing a condition of the event and described using a second label corresponding to the label;

perform matching of the sensor-side attribute information and the app-side attribute information, in order to determine whether the sensing data satisfies a requirement of the application;

determine, in a case where the sensing data satisfies the requirement of the application, whether the first label included in the sensor-side metadata and the second label described in the event condition included in the app-side metadata are identical;

and transmit, in a case where the first label included in the sensor-side metadata and the second label described in the event condition included in the app-side metadata are identical, a dataflow control command including information specifying the sensor, information specifying the application and the event condition included in the app-side metadata.

Supplementary Note 3

A data distribution apparatus including a hardware processor, the hardware processor being configured to:

receive transmission data including distribution data which is sensing data output by a sensor and event data that is used in order to detect an event;

receive a dataflow control command including information specifying the sensor, information specifying an application and an event condition showing a condition of the event;

convert the event condition included in the dataflow control command into a computer program to generate an event condition determination program;

execute the event condition determination program, in order to determine whether the event data included in the received transmission data satisfies the event condition included in the dataflow control command; and transmit, in a case where the event data included in the received transmission data satisfies the event condition included in the dataflow control command, the distribution data included in the received transmission data.

Supplementary Note 4

A sensor management apparatus including a hardware processor, the hardware processor being configured to:

receive distribution data which is sensing data output by a sensor;

generate transmission data including the distribution data and event data that is used in order to detect an event; and transmit the transmission data.

The invention claimed is:

1. A data distribution system comprising an instruction apparatus, a sensor management apparatus, and a data distribution apparatus connected to the instruction apparatus and the sensor management apparatus, the sensor management apparatus including:
a first data reception unit configured to receive distribution data which is sensing data output by a first sensor;
a generation unit configured to generate transmission data including the distribution data and event data that is used in order to detect an event; and
a first transmission unit configured to transmit the transmission data to the data distribution apparatus, the instruction apparatus including:
a sensor-side metadata acquisition unit configured to acquire sensor-side metadata including sensor-side attribute information relating to an attribute of the sensing data and a first label corresponding to a label showing a name given in order to identify the event data;
an app-side metadata acquisition unit configured to acquire app-side metadata including app-side attribute information relating to an attribute of sensing data required by an application and an event condition showing a condition of the event and described using a second label corresponding to the label;
an attribute information matching unit configured to perform matching of the sensor-side attribute information and the app-side attribute information, in order to determine whether the sensing data satisfies a requirement of the application;
a determination unit configured to, in a case where the sensing data satisfies the requirement of the application, determine whether the first label included in the sensor-side metadata and the second label described in the event condition included in the app-side metadata are identical; and
an instruction unit configured to, in a case where the first label included in the sensor-side metadata and the second label described in the event condition included in the app-side metadata are identical, transmit a dataflow control command including information specifying the first sensor, information specifying the application and the event condition included in the app-side metadata to the data distribution apparatus, and the data distribution apparatus including:

a dataflow control command reception unit configured to receive the dataflow control command;

an event condition program conversion unit configured to convert the event condition included in the dataflow control command into a computer program to generate an event condition determination program;

a second data reception unit configured to receive the transmission data;

an event condition determination program execution unit configured to execute the event condition determination program, in order to determine whether the event data included in the received transmission data satisfies the event condition included in the dataflow control command; and a second transmission unit configured to, in a case where the event data included in the received transmission data satisfies the event condition included in the dataflow control command, transmit the distribution data included in the received transmission data.

2. The data distribution system according to claim 1, wherein the first data reception unit is configured to receive, as the event data, sensing data output by a second sensor that is different from the first sensor.

3. The data distribution system according to claim 1, wherein the determination unit is configured to extract all of the first labels from the sensor-side metadata, generate a first label list including the extracted first labels, extract all of the second labels from the app-side metadata, generate a second label list including the extracted second labels, and, in a case where the second labels in the second label list are all included in the first label list, determine that the first labels included in the sensor-side metadata and the second labels described in the event condition included in the app-side metadata are identical.

4. The data distribution system according to claim 1, wherein the data distribution apparatus further includes:

an event condition determination program storage unit configured to store the event condition determination program in association with the information specifying the sensor and the information specifying the application included in the dataflow control command.

5. The data distribution system according to claim 1, wherein the data distribution apparatus further includes a data storage unit configured to store the received transmission data.

6. An instruction apparatus comprising:

a sensor-side metadata acquisition unit configured to acquire sensor-side metadata including sensor-side attribute information relating to an attribute of sensing data that is output from a sensor and a first label corresponding to a label showing a name given in order to identify event data that is used in order to detect an event;

an app-side metadata acquisition unit configured to acquire app-side metadata including app-side attribute information relating to an attribute of sensing data required by an application and an event condition showing a condition of the event and described using a second label corresponding to the label;

an attribute information matching unit configured to perform matching of the sensor-side attribute information and the app-side attribute information, in order to determine whether the sensing data satisfies a requirement of the application;

a determination unit configured to, in a case where the sensing data satisfies the requirement of the application, determine whether the first label included in the sensor-side metadata and the second label described in the event condition included in the app-side metadata are identical; and an instruction unit configured to, in a case where the first label included in the sensor-side metadata and the second label described in the event condition included in the app-side metadata are identical, transmit to a sensor management apparatus configured to manage the sensor, a dataflow control command including information specifying the sensor, information specifying the application and the event condition included in the app-side metadata, the sensor management apparatus configured to, determine whether the event data satisfies the event condition included in the dataflow control command and in a case where the event data satisfies the event condition included in the dataflow control command, transmit the sensing data to the application.

7. A data distribution apparatus comprising:

a data reception unit configured to receive transmission data including distribution data which is sensing data output by a sensor and event data that is used in order to detect an event;

a dataflow control command reception unit configured to receive a dataflow control command including information specifying the sensor, information specifying an application and an event condition showing a condition of the event;

an event condition program conversion unit configured to convert the event condition included in the dataflow control command into a computer program to generate an event condition determination program;

an event condition determination program execution unit configured to execute the event condition determination program, in order to determine whether the event data included in the received transmission data satisfies the event condition included in the dataflow control command; and a transmission unit configured to, in a case where the event data included in the received transmission data satisfies the event condition included in the dataflow control command, transmit the distribution data included in the received transmission data.

8. A non-transitory computer readable medium storing a program for causing a computer to operate as the instruction apparatus according to claim 6.

9. A non-transitory computer readable medium storing a program for causing a computer to operate as the data distribution apparatus according to claim 7.

10. The data distribution system according to claim 2, wherein the determination unit is configured to extract all of the first labels from the sensor-side metadata, generate a first label list including the extracted first labels, extract all of the second labels from the app-side metadata, generate a second label list including the extracted second labels, and, in a case where the second labels in the second label list are all included in the first label list, determine that the first labels included in the sensor-side metadata and the second labels described in the event condition included in the app-side metadata are identical.

11. The data distribution system according to claim 2, wherein the data distribution apparatus further includes:
an event condition determination program storage unit configured to store the event condition determination program in association with the information specifying the sensor and the information specifying the application included in the dataflow control command.

12. The data distribution system according to claim 3, wherein the data distribution apparatus further includes:
an event condition determination program storage unit configured to store the event condition determination program in association with the information specifying the sensor and the information specifying the application included in the dataflow control command.

13. The data distribution system according to claim 2, wherein the data distribution apparatus further includes a data storage unit configured to store the received transmission data.

14. The data distribution system according to claim 3, wherein the data distribution apparatus further includes a data storage unit configured to store the received transmission data.

15. The data distribution system according to claim 4, wherein the data distribution apparatus further includes a data storage unit configured to store the received transmission data.

* * * * *